(12) United States Patent
Ichiryu

(10) Patent No.: US 7,198,465 B1
(45) Date of Patent: Apr. 3, 2007

(54) FASTENING ARRANGEMENT FOR A SPLIT CASING

(75) Inventor: Taku Ichiryu, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 92 days.

(21) Appl. No.: 09/680,400

(22) Filed: Oct. 5, 2000

(30) Foreign Application Priority Data

Oct. 8, 1999 (JP) ............................... 11-288549

(51) Int. Cl.
  *F01D 25/24* (2006.01)
  *F04D 29/40* (2006.01)

(52) U.S. Cl. ............... 415/214.1; 415/134; 411/82.5; 411/384; 411/546; 411/916; 411/917; 403/30; 403/337; 285/187; 285/367; 285/905

(58) Field of Classification Search ........... 415/134, 415/214.1; 411/383–384, 82.5, 916–917, 411/546; 403/28–30, 335–338; 285/187, 285/367, 905

See application file for complete search history.

(56) References Cited

U.S. PATENT DOCUMENTS

| | | | |
|---|---|---|---|
| 1,046,600 A * | 12/1912 | Kahler | .................... 285/187 |
| 2,133,146 A | 10/1938 | Larrecq | |
| 4,137,006 A | 1/1979 | Becker | |
| 4,208,777 A * | 6/1980 | Walsh et al. | ............. 415/214.1 |
| 5,054,982 A * | 10/1991 | Freeman | ................... 411/383 |
| 5,511,941 A | 4/1996 | Brandon | |

FOREIGN PATENT DOCUMENTS

| | | | | |
|---|---|---|---|---|
| CH | 171458 A * | 11/1934 | ............... 285/187 |
| DE | 2842986 A1 * | 4/1979 | ............... 403/28 |
| DE | 196 05 068 | 8/1997 | |
| GB | 718625 A * | 11/1954 | ............... 285/187 |
| JP | 53-93406 | 8/1978 | |
| JP | 58-138207 A * | 8/1983 | ............. 415/214.1 |

* cited by examiner

*Primary Examiner*—Christopher Verdier
(74) *Attorney, Agent, or Firm*—Oblon, Spivak, McClelland, Maier & Neustadt, P.C.

(57) ABSTRACT

A casing of a hydraulic machine such as a gas turbine is formed as a horizontally split type flangeless casing. The flangeless casing consists of an upper casing and a lower casing joined together at joint faces and fastened by fastening bolts. The fastening bolt has a screw thread which engages the threaded hole on the joint face of the lower casing. A bolt hole having an internal screw thread and through which the fastening bolt passes is provided in the upper casing. A sleeve having an external screw thread is fitted into the bolt hole of the upper casing by engaging the external screw of the sleeve with the internal sleeve of the bolt hole. An enlarged diameter portion is formed on a shaft of the fastening bolt at the portion where the enlarged diameter portion abuts an upper end face of the sleeve when the fastening bolt is screwed into the threaded hole in the lower casing. When the fastening bolt is tightened, the shaft tensile force of the bolt is received by the abutment of the enlarged diameter portion and the upper end face of the sleeve and, then, transferred from the sleeve to the upper casing through the engagement of the external screw thread of the sleeve and the internal screw thread of the bolt hole of the upper casing and generates the fastening force which presses the upper casing to the lower casing.

4 Claims, 9 Drawing Sheets

PRIOR ART

PRIOR ART

PRIOR ART

PRIOR ART

FASTENING ARRANGEMENT FOR A SPLIT CASING

BACKGROUND OF THE INVENTION

1. Field of the Invention

The present invention relates to a fastening arrangement for a split casing. More specifically, the present invention relates to a fastening arrangement which is especially advantageous, for example, when used for forming casings of hydraulic machines, such as turbines and compressors, as flangeless casings.

2. Description of the Related Art

A horizontally split type casing construction is commonly used for casings of turbines and compressors. In the horizontally split type casing construction, a casing is divided into two segments by a plane including a center axis thereof. Usually, each casing segment (casing half) is provided with plate-like flanges having a relatively large thickness at joint portions of the casing. The casing halves are coupled to each other by joining and fastening the flanges together by fastening bolts.

FIG. 7 illustrates a fastening arrangement of a conventional horizontally split type casing having flanges. FIG. 7 shows a section perpendicular to an axis of the casing.

In FIG. 7, reference numeral 100 designates a casing consisting of two casing halves 110a and 120a. 110b and 120b designate flanges formed at the joint portions of the casing halves 110a and 120a. The flanges 110b and 120b are fastened together by a plurality of fastening bolts 115. Each of the fastening bolts is provided with a bolt head 115d at one end thereof and a screw thread 115a at the other end thereof. Threaded bolt holes 120c which engage the screw threads 115a of the bolts 115 are provided on the flange 120b of one of the casing halves 120a. Further, the flange 110b of the other casing half 110a is provided with bolt holes 110c. In order to joint two casing halves 110a and 120a, the fastening bolts 115 are inserted into the bolt holes 110c of the flanges 110b of the casing half 110a and the threads 115a of the bolt 115 are screwed into the threaded bolt holes 120c on the flanges 120b of the casing half 120a until the bolt heads 115d are pressed against the upper face of the flange 110b. By tightening the fastening bolt 115, the flanges 110b and 120b are firmly pressed against each other by the bolt heads 115d and the screw threads 115a of the bolt 115. In this condition, the tensile force is generated on the shaft of the bolt by tightening the bolt 115. The reaction force of the shaft tensile force is exerted on the upper face of the flange 110b through the bolt heads 115d and also on the screw threads of the threaded bolt holes 120c in the opposite direction. Due to these reaction forces, the flanges 110b and 120b are pressed against each other.

However, in some cases, problems occur when the fastening arrangement using the flanges as illustrated in FIG. 7 is used for the horizontally split type casings of hydraulic machines such as turbines or compressors.

In hydraulic machines having rotors, the casings containing rotors must have strictly circular cross sections especially at the inner peripheries. However, in the turbines and compressors, since the temperature of the fluid passing through the casings is high, the temperature of the respective portions of the casings becomes high. If the temperature of the casing wall varies in the respective portions, a large thermal stress is generated by the difference in the amount of the thermal expansion of the respective portions of the casing. When a large thermal stress is generated, the casing tends to deform and concentricity of the cross section of the casing cannot be maintained. Further, in the turbines and compressors, the temperature of the fluid passing through the machines changes considerably due to a change in the operating load. In this case, if the casing is provided with flanges having a thickness larger than other portions of the casing, the change in the temperature of the flanges is late compared with the other portions. This causes a large temperature difference between the flanges and other casing portions when the rate of the change in the temperature of the fluid in the casing is high. Therefore, if the casing is provided with flanges having a large thickness, distortion of the casing may occur when the temperature of the fluid changes.

In turbines and compressors, rotors rotating at high speed are accommodated in the casings. Therefore, if distortion of the casing occurs, the outer periphery of the rotor (such as the tips of the turbine blades) contacts with the inner periphery of the casing. This may cause damage to the machine. It is true that the contact between the rotor and the casing can be avoided even in this case if the clearance between the tips of the turbine blades and the inner periphery of the casing is set at a relatively large value. However, in the hydraulic machines such as turbines and compressors, since the efficiency of the machine decreases as the tip clearance becomes larger, it is not practical to set the tip clearance to a large value.

In order to solve the problems explained above, a flangeless casing which eliminates the use of the flanges is used in some cases for the horizontal split type casing. The flangeless casing is a casing which does not use flanges such as shown in FIG. 7 for joining the casing halves. FIG. 8 is a sectional view similar to FIG. 7 which illustrates a typical fastening arrangement of a flangeless casing.

As can be seen from FIG. 8, the casing halves 210a and 220a of the flangeless casing 200 have semi-circular cross sections without flanges at joining faces. The bolt holes 210c and 220c for fastening bolts 215 are drilled in the tangential direction in the walls of the casing halves 210a and 220a. Spot facings are formed on the upper ends of the bolt holes 210c in order to obtain a close contact between the surfaces of the casing half 210a around the bolt holes 210c and the bolt heads 215d of the fastening bolts 215.

In the flangeless casings as shown in FIG. 8, since the flanges having a large thickness are not used, a non-uniformity of the thickness of the casing is smaller compared with the flanged casings and the distortion of the casing due to the change in the temperature of the fluid also becomes smaller. However, even in the flangeless casing in FIG. 8, the problems similar to the flanged casings may occur when the pressure or the temperature of the internal fluid is high.

In the flangeless casings in FIG. 8, since the spot facings 210d are provided, the diameters of the bolt holes 210c above the spot facings are required to be the same as the diameters of the spot facings 210d. Therefore, the diameter of the bolt holes 210c becomes much larger than the minimum diameter required for allowing the bolt 215 to pass through. This means that a larger amount of metal must be removed from the walls of the casing half 210a and reduced wall thickness portions are formed by the bolt holes 210c. As illustrated in FIG. 8 the wall thickness becomes the smallest ($T_1$ in FIG. 8) at the portion where the spot facings are formed.

FIG. 9 schematically shows a section of the wall of the casing half 210a around the spot facings 210d taken along the line A—A in FIG. 8. As can be seen from FIG. 9, the wall is cut off in a cylindrical shape around the spot facings 210d and only a solid metal in the shape of the hatched area remains. The average wall thickness of the portions shown by the hatched area is represented by $T_2$ in FIG. 9. In other words, the effective wall thickness of the casing around the spot facings is reduced to a substantially small value $T_2$ when the spot facings are formed. Therefore, in the flangeless casing in FIG. 8, reduced wall thickness portions are formed in the casing 210a by the spot facings 210d. Since the distortion of the casing occurs at these reduced wall thickness portions when the internal pressure or temperature of the casing is high, problems similar to those of the flanged casing of FIG. 7 occur.

In order to prevent the formation of the reduced wall thickness portions, it is necessary to reduce the diameters d (FIG. 8) of the spot facings 210d. However, practically it is not possible to reduce the diameter of the spot facing beyond some limit for the reasons explained below.

During the operation of the hydraulic machines, a large shaft tensile force are required for the fastening bolts in order to hold the casing halves together against the force generated by the internal fluid pressure and thermal stress exerting on the casing halves in a direction separating the casing halves from each other.

This means that a large force must be transferred from the fastening bolts to the casing 210a through the contacts between the bolt heads 215d and the spot facings 210d. Generally, the fastening bolts are made of a material having a high strength such as a high tension alloy. On the other hand, usually, a material having a high strength are not used for the casing halves in order to facilitate machining of the casing (such as cutting and, if required, welding) and to obtain a high resistance to a low frequency fatigue. Therefore, the maximum value of the contact pressure between the bolt heads and the casing is limited by the material used for the casing. Consequently, the diameter of the spot facing must be sufficiently large in order to reduce the contact pressure between the bolt head and the casing to within the allowable limit determined by the material of the casing while maintaining a sufficiently large shaft tensile force of the fastening bolt. Thus, it is practically difficult to reduce the diameter of the spot facings in order to increase the effective wall thickness of the casing around the spot facings.

Further, it is preferable to dispose the fastening bolts at a smaller interval around the casing in order to obtain a large and uniform tightening force around the casing. However, since a large diameter is required for the spot facings, it is difficult to reduce the distance between the bolt holes 210c. A sufficiently large and uniform tightening force of the casing halves cannot be obtained in some cases in the flangeless casing in FIG. 8.

SUMMARY OF THE INVENTION

In view of the problems in the related art as set forth above, the objects of the present invention is to provide a fastening arrangement of a split casing capable of reducing the interval between the fastening bolts in order to obtain a large and uniform tightening force of the casing while maintaining a sufficiently large wall thickness of the casing.

The object as set forth above is achieved by a fastening arrangement for a split casing, according to the present invention, in which a casing is assembled by fastening a plurality of casing segments, comprising a first and a second casing segments assembled together by joining joint faces of the respective casing segments, the first and second casing segments are provided with bolt holes in such a manner that the bolt hole of the first casing segment and the bolt hole of the second casing segment align with each other and, when the first and the second casing segments are assembled together, form a continuous bolt hole crossing the joint faces and extending in both casing segments and, at least the bolt hole in the first casing segment is provided with an internal screw thread, a sleeve having an external screw thread and being fitted into the bolt hole of the first casing segment by engaging the external screw thread of the sleeve with the internal screw thread of the bolt hole of the first casing segment and a fastening bolt provided with fastening means and passing through the bolt hole of the first casing segment and the sleeve therein, wherein the fastening means abuts an end of the sleeve opposite to the joint face and, when a tensile force is exerted on the fastening bolt at the portion between the fastening means and the second casing segments, the tensile force is first transferred from the fastening bolt to the sleeve through the abutment of the fastening means and the end face of the sleeve, then transferred from the sleeve to the first casing segment through the engagement of the external screw thread of the sleeve and the internal screw thread of the bolt hole and generates a fastening force for pressing the first casing segment against the second casing segment.

According to this aspect of the present invention, the fastening bolt does not directly contact the first casing segment. The shaft tensile force is transferred to the first casing segments through the sleeve. Since the sleeve can be made of a material separate from the casing segments, a material similar to that of the fastening bolt, i.e. a material having a high strength can be used for the sleeve. Therefore, the allowable maximum contact pressure between the fastening element and the end face of the sleeve can be largely increased. Thus, the contact area of the end face of the sleeve and the fastening element (i.e., the outer diameter of the sleeve) can be largely reduced without reducing the fastening force of the casing segments. Since this makes it possible to reduce the diameter of the bolt holes, the effective wall thickness of the casing can be increased and the interval between the fastening bolts can be reduced.

According to another aspect of the present invention, there is provided a fastening arrangement for a horizontally split type casing for a hydraulic machine in which the casing of the hydraulic machine is assembled by fastening two casing halves, comprising a first and a second casing halves assembled together by joining joint faces of the respective casing halves, the first and second casing halves are provided with bolt holes in such a manner that the bolt hole of the first casing half and the bolt hole of the second casing half align with each other and, when the first and the second casing halves are assembled together, form a continuous bolt hole crossing the joint faces and extending in both casing halves, the bolt holes in the first and the second casing halves are provided with internal screw threads, a sleeve having an external screw thread and being fitted into the bolt hole of the first casing half by engaging the external screw thread of the sleeve with the internal screw thread of the bolt hole of the first casing half, a fastening bolt provided with an external screw thread at one end for engaging the internal screw thread of the bolt hole in the second casing half and fastening means at the portion apart from the external screw thread, the fastening bolt passing through the bolt hole of the first casing half and the sleeve therein, wherein the fastening means abuts an end of the sleeve opposite to the joint face when the fastening bolt is screwed into the bolt hole in the second casing half, thereby a tensile force generated in the fastening bolt by screwing the fastening bolt into the bolt hole in the second casing half is first transferred from the fastening bolt to the sleeve through the abutment of the fastening means and the end face of the sleeve, then transferred from the sleeve to the first casing segment through the engagement of the external screw thread of the sleeve and internal screw thread of the bolt hole in the first casing half and generates a fastening force for pressing the first casing half against the second casing half.

According to this aspect of the present invention, a casing of a hydraulic machine such as a turbine, a compressor or a pump is constructed as a horizontally split type casing. Also in this aspect of the invention, the shaft tensile force of the fastening bolt is transferred to the upper casing through the sleeve in order to increase the contact pressure between the end face of the sleeve and the fastening element. Since the effective wall thickness of the casing can be increased and the interval of the fastening bolts can be reduced, the casing halves are fastened together rigidly even though a high internal pressure and a high temperature is exerted on the casing of the hydraulic machine.

BRIEF DESCRIPTION OF THE DRAWINGS

The present invention will be better understood from the description, as set forth hereinafter, with reference to the accompanying drawings in which.

DESCRIPTION OF THE PREFERRED EMBODIMENT

Hereinafter, embodiments of a fastening arrangement for a flangeless casing according to the present invention will be explained with reference to FIGS. 1 through 6.

(1) First Embodiment

Figure 1:
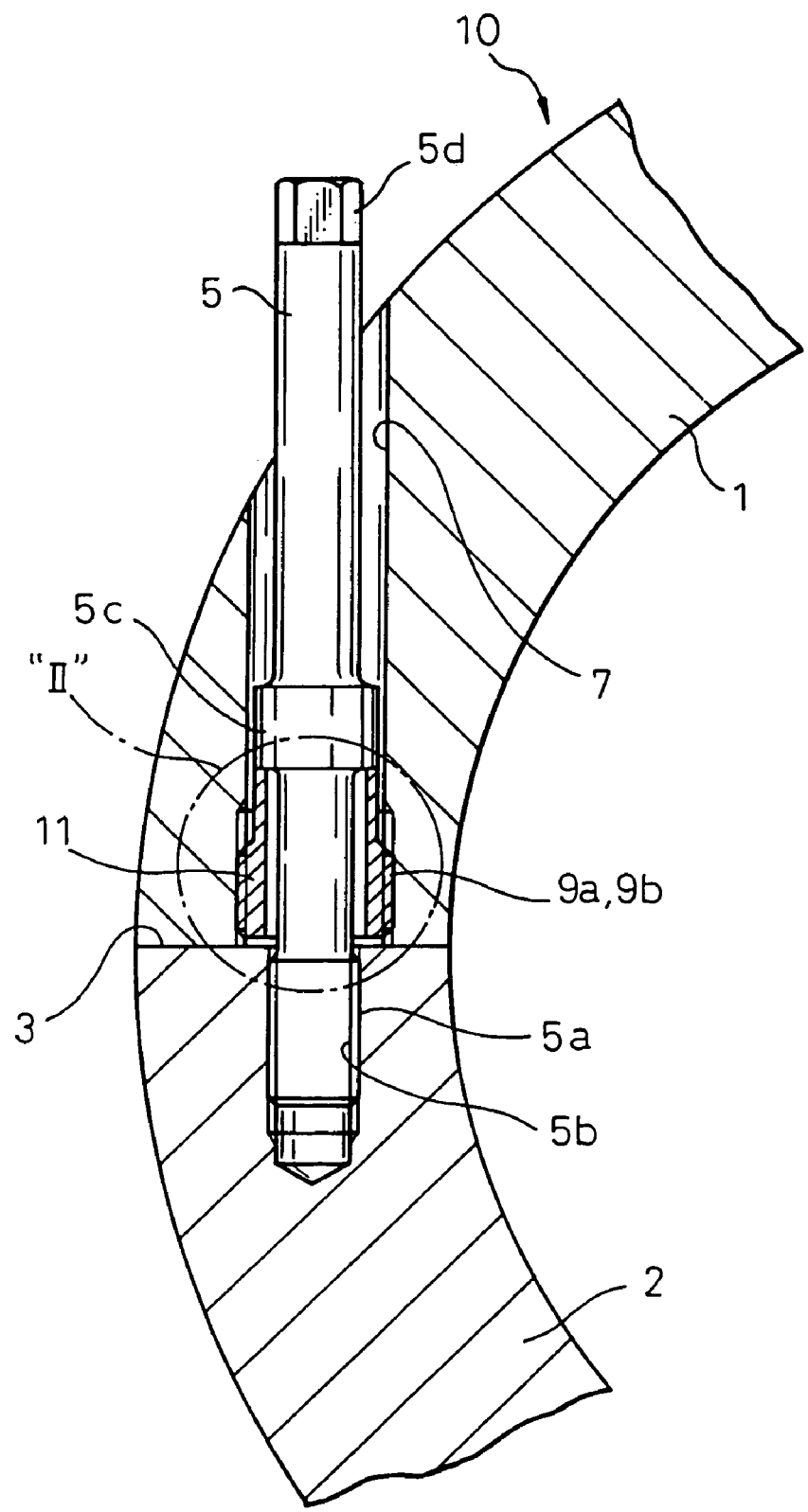
FIG. 1 is a sectional view illustrating an embodiment of a fastening arrangement for a flangeless casing according to the present invention.

FIG. 1 illustrates a first embodiment of a fastening arrangement for a flangeless casing according to the present invention.

FIG. 1 is a sectional view of a casing of a gas turbine taken along the plane perpendicular to the center axis. The casing 10 of the gas turbine in FIG. 1 is constructed as a horizontally split type flangeless casing. More specifically the casing 10 in FIG. 1 is a cylindrical shape and split into two casing halves 1 and 2 by a plane including the center axis. The casing half 1 (hereinafter referred to as the "upper casing") and the casing half 2 (hereinafter referred to as the "lower casing") are coupled by joining joint faces 3 and fastened to each other firmly.

In FIG. 1, reference numeral 5 designates a plurality of fastening bolts for fastening the upper casing 1 and lower casing 2 together. In this embodiment, a screw thread 5a is formed at lower end portion of each fastening bolt 5. The fastening bolts 5 pass through bolt holes 7 drilled in the upper casing 1 perpendicularly to the joint face 3 and the screw threads 5a at the end thereof are screwed into threaded holes 5b formed on the joint faces 3 of the lower casing 2. In this embodiment, the lengths of the bolts 5 are determined in such a manner that the upper end portions of the respective fastenings bolts 5 protrude from the bolt holes 7 of the upper casing 1 when the bolts 5 are tightened. The protruding ends of the fastening bolts 5 are formed as polygonal heads 5d to facilitate tightening the bolts 5 by a tightening tool such as a wrench.

Figure 2:
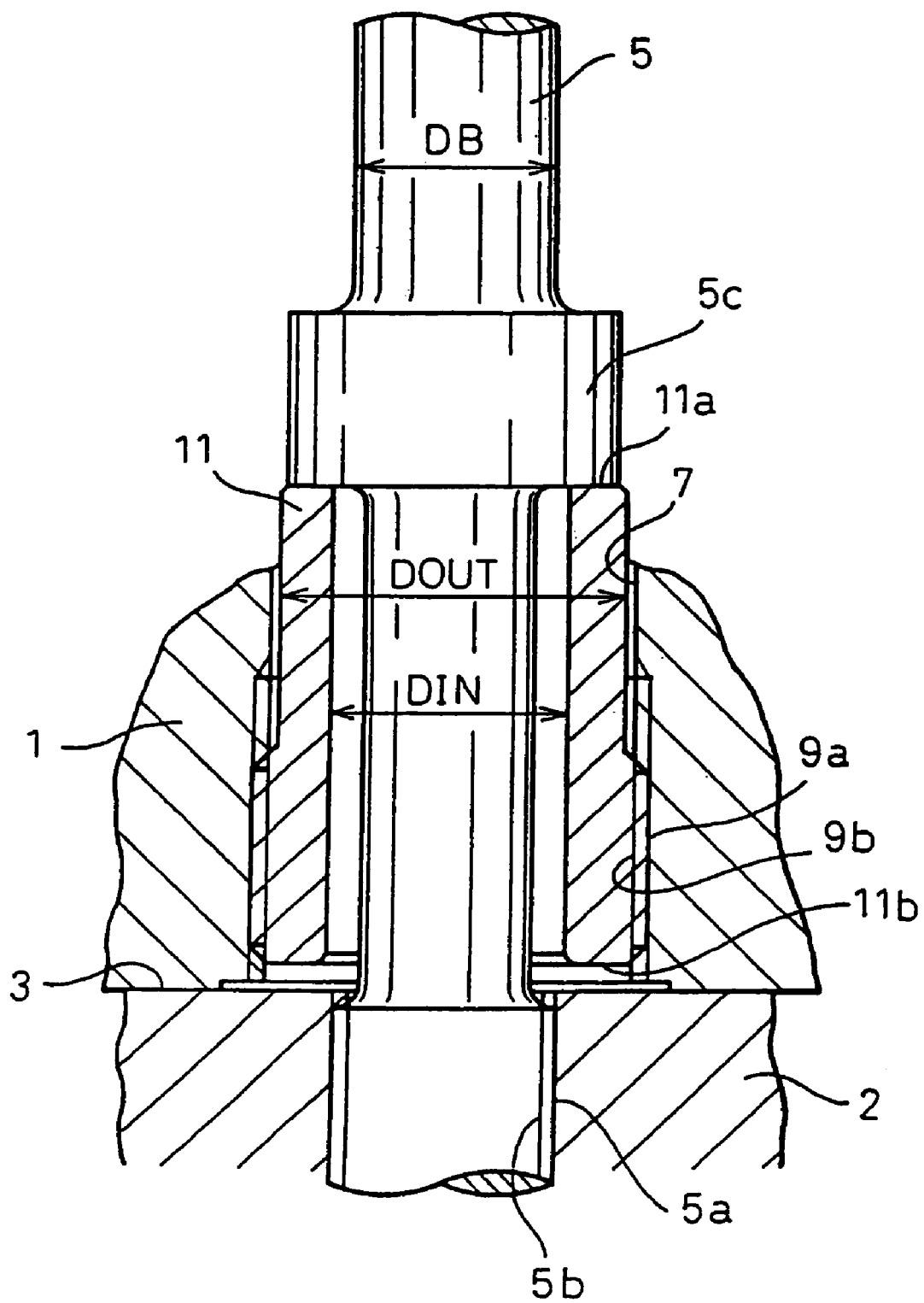
FIG. 2 is an enlarged view of the portion II in FIG. 1

FIG. 2 is an enlarged view of the portion indicated by II in FIG. 1. As can be seen from FIG. 2, an internal screw thread 9a is formed on the inner surface of the bolt hole 7 near the joint face 3. A cylindrical sleeve 11 having external thread 9b which engages the internal thread 9a is fitted in the bolt hole 7 by screwing the sleeve 11 into the bolt hole 7. When the sleeve 11 is fitted into the bolt hole 7, a clearance is formed between the lower end 11b of the sleeve 11 and the joint face 3 in order to avoid the contact between the lower end 11b of the sleeve 11 and the joint face 3 of the lower casing 2 when the fastening bolt 5 is fully tightened.

An enlarged diameter portion 5c is formed on the shaft portion of the fastening bolt 5 at the portion located inside of the bolt hole 7 when the bolt 5 is tightened. The enlarged diameter portion may instead be a nut threaded onto the bolt shaft. The diameter of the enlarged diameter portion 5c is slightly smaller than the diameter of the bolt hole 7. When the fastening bolt 5 is screwed into the threaded hole 5b of the lower casing 2, the lower face of the enlarged diameter portion 5c is pressed against the upper end face 11a of the sleeve 11. Therefore, when the fastening bolt 5 is further tightened, a tensile force is generated in the shaft portion of the fastening bolt 5. The reaction force of this shaft tensile force is transferred from the enlarged diameter portion 5c to the upper end face 11a of the sleeve 11 and a downward force is exerted on the sleeve 11. Since the external thread 9b of the sleeve 11 engages the internal thread 9a of the bolt hole 7, the downward force exerted on the sleeve 11 is received by the upper casing 1. Thus, the shaft tensile force of the fastening bolt 5 is converted to a tightening force which presses the upper casing 1 against the lower casing 2.

As explained above, the tightening force of the casing 10 in this embodiment is transferred to the upper casing 1 through the engagement between the thread 9b of the sleeve 11 and the thread 9a of the bolt hole 7 and to the lower casing 2 through the engagement between the thread 5a of the fastening bolt 5 and the thread of the threaded hole 5b.

In this embodiment, materials having a relatively low strength such as a carbon steel for boilers and pressure vessels (for example, Japanese industrial standard (JIS) SB410) or a cast steel for high temperature and high pressure (for example, JIS SCPH32) are used for the upper casing 1 and lower casing 2 to facilitate machining of the upper and lower casings. On the other hand, a material having a high strength, such as alloy steel bolting material (JIS SNB7) or heat resisting steel (JIS SUH616) is used for the fastening bolts 5 in order to obtain a large tightening force of the casing 10. Therefore, if the conventional fastening arrangement in which the bolt heads of the fastening bolts directly contact the upper casing is used, the maximum allowable contact pressure between the bolt heads and the casing is limited by the strength of the material used for casing. Thus, as explained before, spot facings having large diameters are required for the casing in order to lower the contact pressure between the bolt heads and the casing. This causes the problems explained before, i.e., a smaller wall thickness of the casing at the spot facings and a larger intervals of the fastening bolts.

These problems are solved by inserting the cylindrical sleeve 11 made of a high strength material similar to that of the fastening bolts 5 (for example, JIS SUH616 or an aluminum chromium molybdenum steel such as JIS SACM645) into the bolt hole 7. The enlarged diameter portion 5c of the fastening bolt 5 abuts the upper end face 11a of the sleeve 11 in this embodiment. However, the sleeve 11 in this embodiment is made of a high strength material similar to that of the fastening bolt 5. Therefore, the allowable contact pressure between the enlarged diameter portion 5c and the upper end face 11a of the sleeve is much higher than that in the case where the bolt head of the fastening bolt 5 directly contacts the upper casing 2. Consequently, the contact pressure can be set at a higher value in order to reduce the contact area between the enlarged diameter portion 5c and the upper end face 11a of the sleeve 11. Thus, the outer diameters of the enlarged portion 5c of the bolt 5 and the sleeve can be set at a value smaller than the diameter of the spot facing required in the case where the bolt head directly contacts the upper casing.

In this embodiment, sleeve 11 is secured to the upper casing 1 through the screw threads 9a and 9b. However, since the number of the threads of the screw threads 9a and 9b can be determined arbitrarily, the contact pressure between the threads 9a and 9b and shearing stresses exerted thereon can be easily adjusted to values lower than the maximum allowable values. Therefore, problems concerning the strength of the thread do not occur in this embodiment.

The effect of the fastening arrangement in the present embodiment in the reduction of the diameter of the bolt hole 7 compared with the diameter of spot facing 210d in FIG. 8 will be explained below in detail using actual numerical values.

Figure 8:
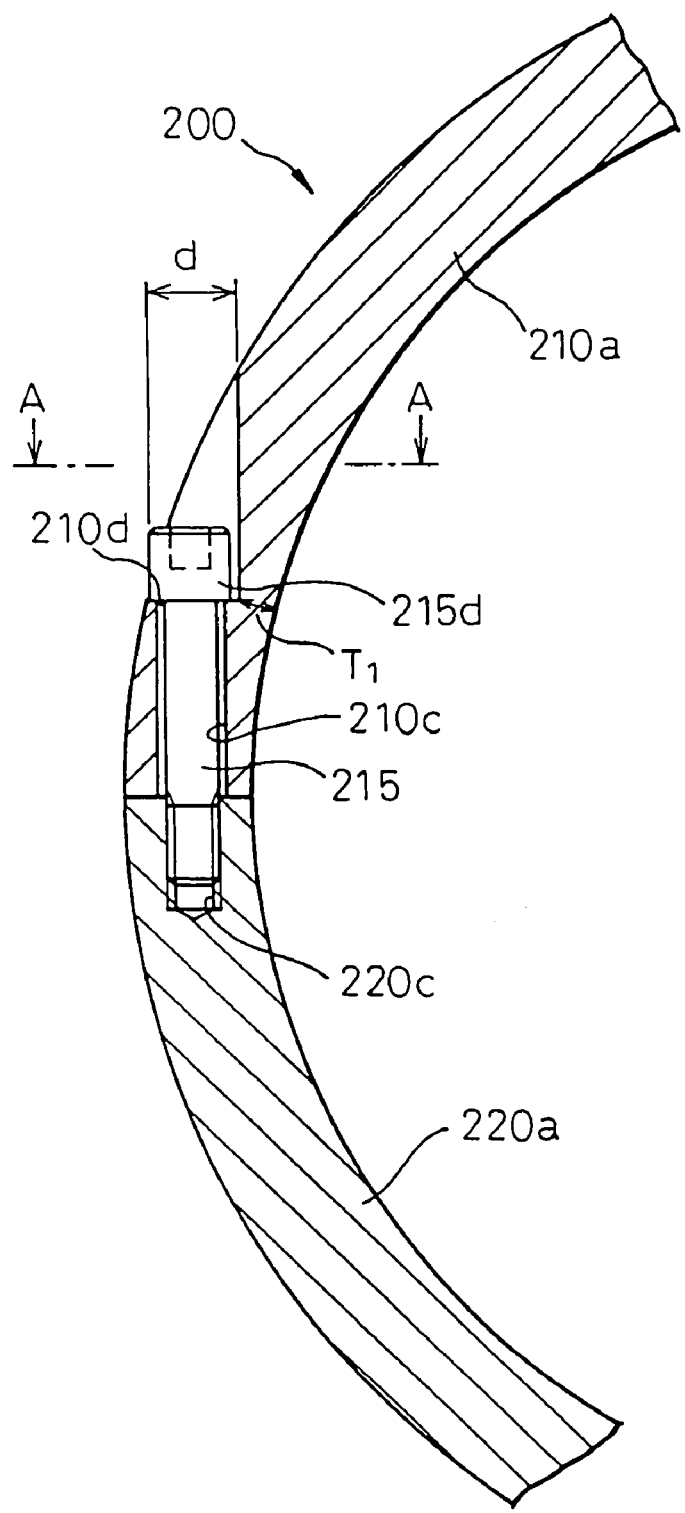
FIG. 8 is a sectional view similar to FIG. 7 illustrating a conventional fastening arrangement for a horizontally split type flangeless casing.
Figure 9:
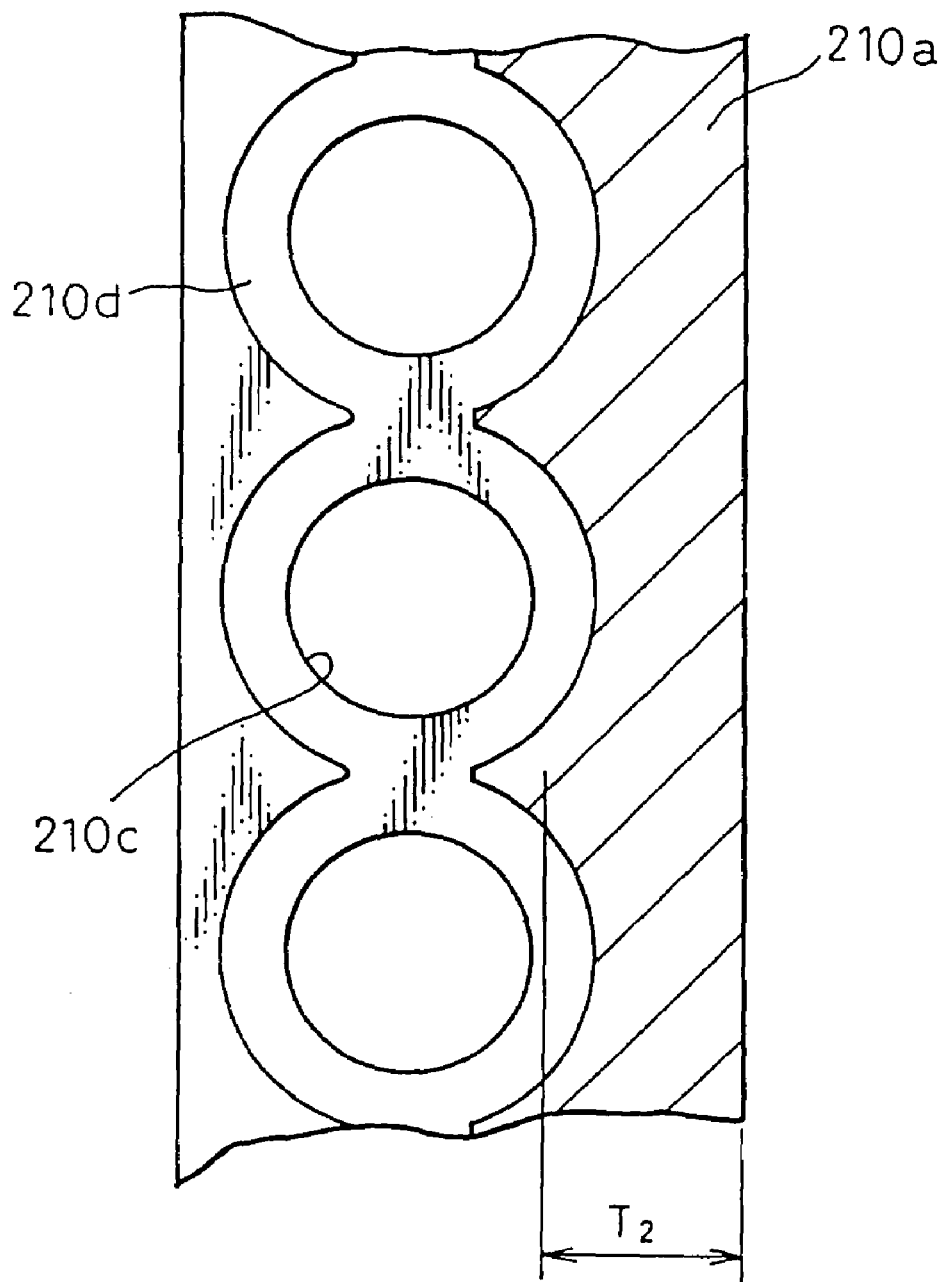
FIG. 9 is a sectional view taken along the line A—A in FIG. 8.

Assuming that a JIS M48 Allen screw is used for the fastening bolt 115 in the conventional fastening arrangement of FIG. 8, the outer diameter of the bolt head 215 becomes 78 mm. Consequently, a minimum 78 mm diameter (shown by d in FIG. 8) is required for the spot facing 210d.

On the other hand, when JIS M48 screw threads are used for the threads 5a and 5b in the fastening arrangement in FIGS. 1 and 2, the outer diameter of the thread 5a of the fastening bolt 5 is 48 mm. Since the inner diameter (DIN in FIG. 2) must be slightly larger than the outer diameter of the thread 5a of the bolt 5 (i.e., 48 mm), the inner diameter DIN of the sleeve 11 is set at, for example, about 49 mm.

The diameter DB of the shaft of the bolt 5 is determined in such a manner that the tensile stress exerted on the shaft when the fastening bolt 5 is fully tightened is less than the maximum allowable tensile stress of the bolt material and, in this embodiment, the shaft diameter DB is set at 41 mm. When the sleeve 11 is made of the material the same as that of the fastening bolt, the contact pressure between the enlarged diameter portion 5c of the bolt 5 and the upper end face 11a of the sleeve is sufficiently lower than the maximum allowable contact pressure if the contact pressure is set at a value less than the tensile stress of the shaft of the bolt 5. Therefore, the minimum required area of the upper end face 11a of the sleeve 11 (i.e., the area of the annular cross section of the sleeve 11) is the same as the cross section area of the shaft portion of the fastening bolt 5. Since the diameter of the shaft portion of the fastening bolt 5 is DB, the cross sectional area of the shaft portion is expressed by $(\pi/4) \times (DB)^2$. Further, assuming that the outer diameter of the sleeve 11 is DOUT, the cross sectional area of the sleeve 11 is expressed by $(\pi/4) \times ((DOUT)^2 - (DIN)^2)$.

Since the cross sectional area of the sleeve 11 must be larger than or equal to the cross sectional area of the shaft portion of the bolt 5, the following relationship is obtained.

$$(\pi/4) \times ((DOUT)^2 - (DIN)^2) \geq (\pi/4) \times (DB)^2$$

Therefore, the required value of DOUT is $$DOUT \geq ((DIN)^2 + (DB)^2)^{1/2}$$

Since DIN=49 mm and DB=41 mm in this embodiment, the minimum value of the outer diameter DOUT of the sleeve 11 becomes about 64 mm.

As can be seen from FIG. 2, the outer diameter DOUT of the sleeve 11 is the same as the minor diameter of the thread 9a (i.e., the diameter of the root of the thread 9a). According to the Japanese industrial standard (JIS), M68 or M72 threads have minor diameters about 64 mm. More precisely, JIS M68 thread has a minor diameter of 61.5 mm and JIS M72 thread has a minor diameter of 66 mm. Therefore, even if a larger size thread (i.e., JIS M72) is used, the outer diameter DOUT of the sleeve 11 is 66 mm. Since the diameter of the bolt hole 7 is the nearly the same as the outer diameter DOUT of the sleeve 11, the diameter of the bolt hole 7 in this embodiment is, at maximum, 66 mm. This diameter of the bolt hole 7 (66 mm) is substantially smaller than the diameter of the spot facing 210d (78 mm) in the conventional fastening arrangement in FIG. 8.

Figure 3A:
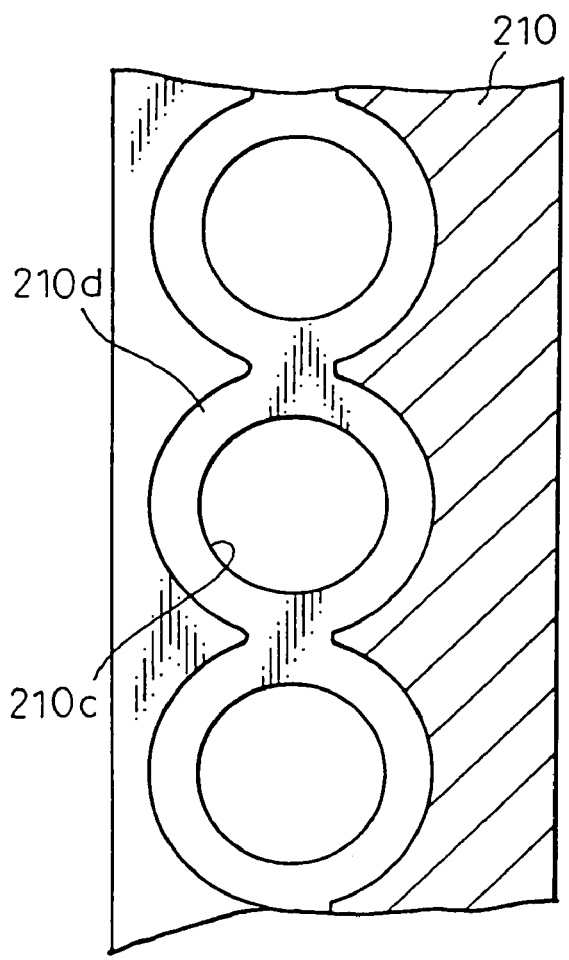
FIG. 3A schematically illustrates the thickness of the casing at spot facings according to the prior art in FIG. 8.
Figure 3B:
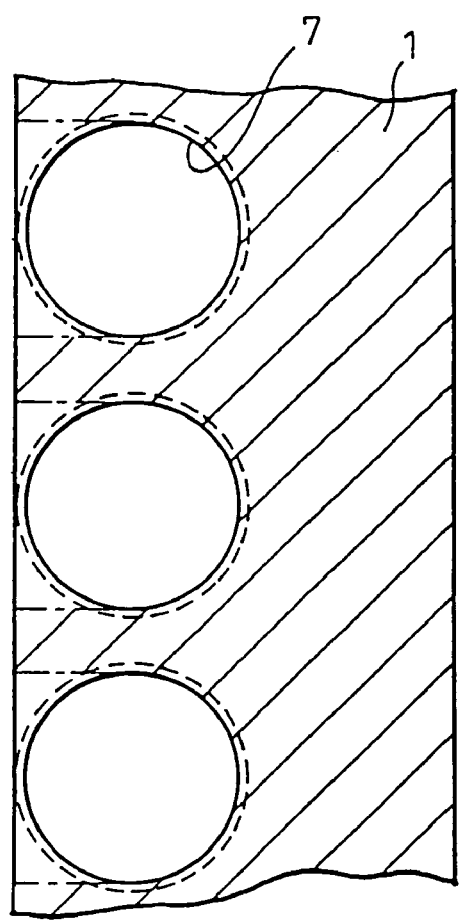
FIG. 3B schematically illustrates the thickness of the casing at spot facings according to the embodiment in FIG. 1.

FIGS. 3A and 3B show the comparison of the minimum wall thickness of the casing in the present embodiment (FIG. 3B) and the conventional fastening arrangement (FIG. 3A) based on the above calculated values. As can be seen from FIGS. 3A and 3B, the minimum wall thickness in the present embodiment increases about 12 mm (=78−66 mm) compared with the conventional fastening arrangement in FIG. 8. Further, it will be understood from FIGS. 3A and 3B that the sectional area of the casing wall (the hatched area in FIGS. 3A and 3B), which determines the magnitude of flexural rigidity of the casing wall, significantly increases in the present embodiment.

Further, though FIGS. 3A and 3B show the case where the interval of the fastening bolt (the bolt pitch) is the same, it will be understood that the bolt pitch can be reduced by maximum of 12 mm in the present embodiment in order to increase the tightening force of the casing.

(2) Second Embodiment

Figure 4:
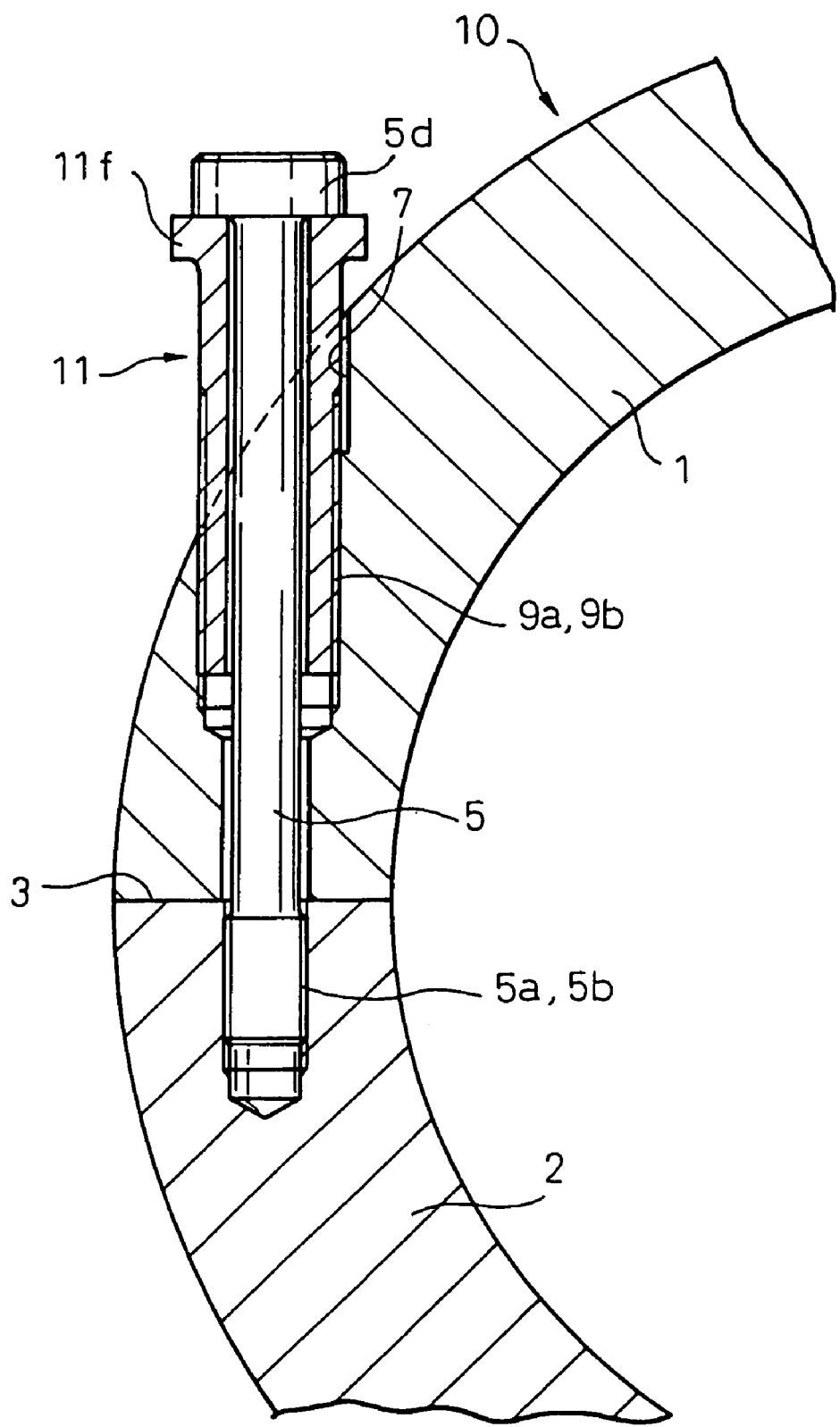
FIG. 4 is a sectional view similar to FIG. 1 illustrating a second embodiment of the present invention.

FIG. 4 is a sectional view similar to FIG. 1 illustrating a second embodiment of the present invention. In FIG. 4, the reference numerals the same as those in FIG. 1 designate similar elements.

In this embodiment, a cylindrical sleeve similar to that in the first embodiment is used. However, although the sleeve 11 in the first embodiment is screwed into the bolt hole 7 from the joint face 3 side thereof, the sleeve 11 in this embodiment is screwed into the bolt hole 7 from the side thereof opposite to the joint face 3 and fitted inside the upper portion of the bolt hole 7. Further, the upper portion of the sleeve 11 protrudes from the bolt hole 7.

In this embodiment, an ordinary Allen screw the same as that in FIG. 8 is used in this embodiment. The diameter of the bolt head of an Allen screw is larger than the required diameter of the sleeve 11 as explained in the previous embodiment. Therefore, in order to avoid an increase in the diameter of the bolt hole 7 due to the large bolt head of the fastening bolt 5, the bolt head 5d is received by a flange 11f formed at the upper end of the sleeve 11 outside of the bolt hole 7 in this embodiment. The bolt head 5d in this embodiment acts as the fastening element similar to the enlarged diameter portion 5c of the first embodiment.

(3) Third Embodiment

Figure 5:
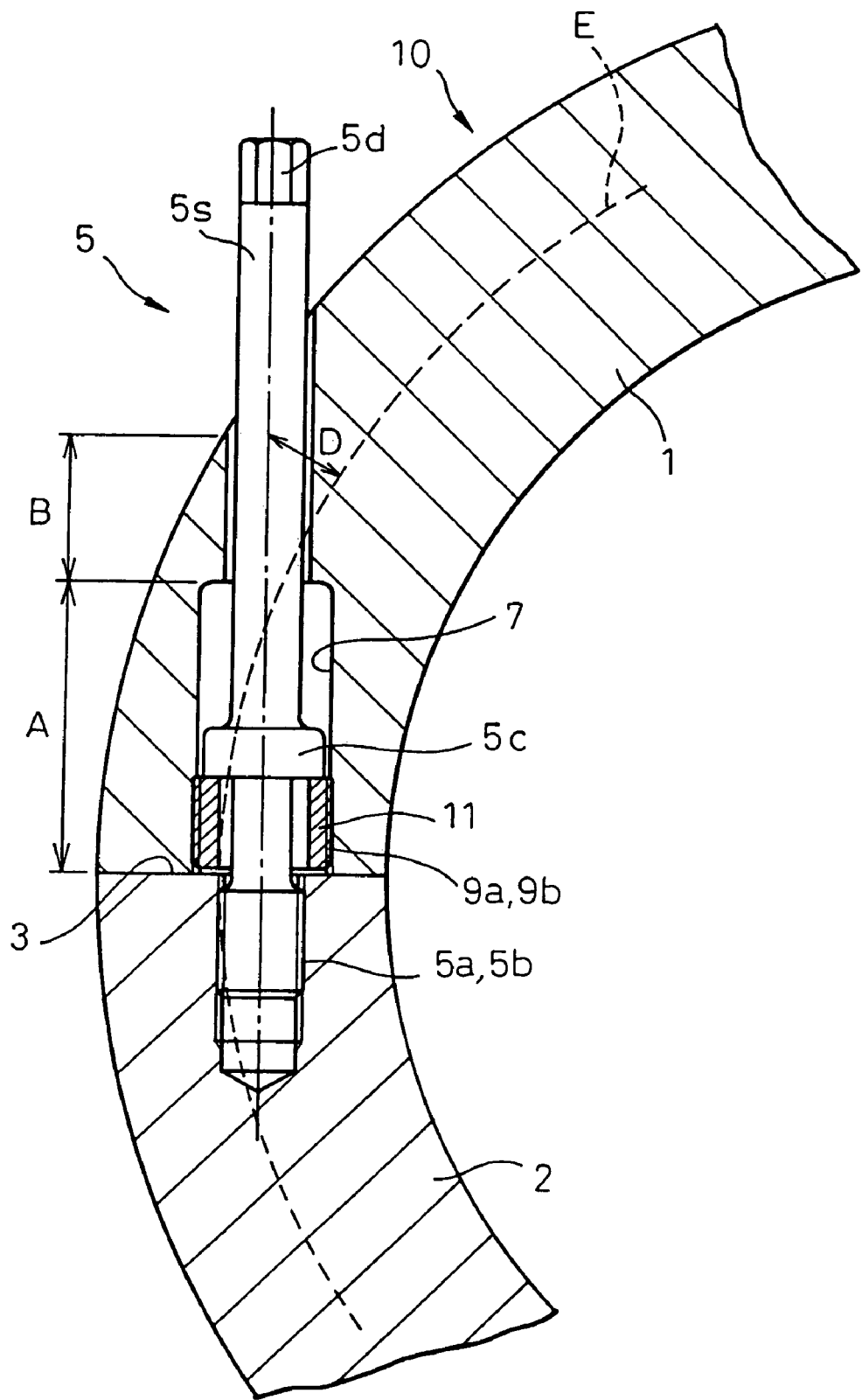
FIG. 5 is a sectional view similar to FIG. 1 illustrating a third embodiment of the present invention.

FIG. 5 is sectional view similar to FIG. 1 but illustrating a third embodiment of the present invention. In FIG. 5, the reference numerals the same as those in FIGS. 1 and 2 designate similar elements.

In this embodiment, similar to the first embodiment, the sleeve 11 is screwed into the bolt hole 7 from the joint face 3 side. However, the shape of the bolt hole 7 in this embodiment is different from that of the first embodiment. Namely, the diameter of the bolt hole 7, is enlarged at the lower portion thereof in order to accommodate the sleeve 11 and the diameter of the bolt hole 7 at the upper portion thereof is reduced to a value slightly larger than the diameter of the shaft portion 5s of the fastening bolt 5.

In contrast with the first embodiment, in order to fastening the casing 10, the fastening bolt 5 is first inserted into the bolt hole 7 from the joint face 3 side, then, the sleeve 11 is screwed into the bolt hole 7 from the joint face 3 side in such a manner that the enlarged diameter portion 5c of the bolt 5 remains in the bolt hole 7 above the sleeve 11. In this condition, the upper casing 1 and the lower casing 2 are joined together by abutting the joint faces 3 and the bolt 5 is screwed into the threaded hole 5b in the lower casing 2.

Since the diameter of the upper portion of the bolt hole 7 is reduced in this embodiment, the flexural rigidity of the casing wall is further increased compared with the first and the second embodiments. The flexural rigidity of the casing wall increases as the geometric moment of inertia (the second moment of area) around the neutral axis E of deflection becomes larger. The neutral axis E of deflection in this case is a center line of the wall thickness of the casing (FIG. 5). Therefore, when the distance between a void such as a bolt hole 7 and the neutral axis E becomes larger, the geometric moment of inertia around the neutral axis becomes smaller and, thereby, the flexural rigidity of the casing wall largely decreases.

In this embodiment, though the diameter of the lower portion (the portion A in FIG. 5) of the bolt hole 7, where the neutral axis E intersects the bolt hole, has a larger diameter, the diameter of the upper portion (the portion B in FIG. 5), where the distance between the neutral axis E and bolt hole 7 increases, is reduced. Since the lower portion B is substantially on the neutral axis E, this portion does not substantially affect the geometric moment of inertia even though the diameter thereof is large. Further, although the distance D between the neutral axis E and the upper portion B of the bolt hole 7 is relatively large, the decrease in the geometric moment of inertia is minimized in this embodiment since the diameter of the upper portion B of the bolt hole 7 is reduced.

Thus, according to the present embodiment, the flexural rigidity of the casing wall is further increased by changing the diameter of the bolt hole 7 according to the distance of the respective portions of the bolt hole from the neutral axis E of deflection.

(4) Fourth Embodiment

Figure 6:
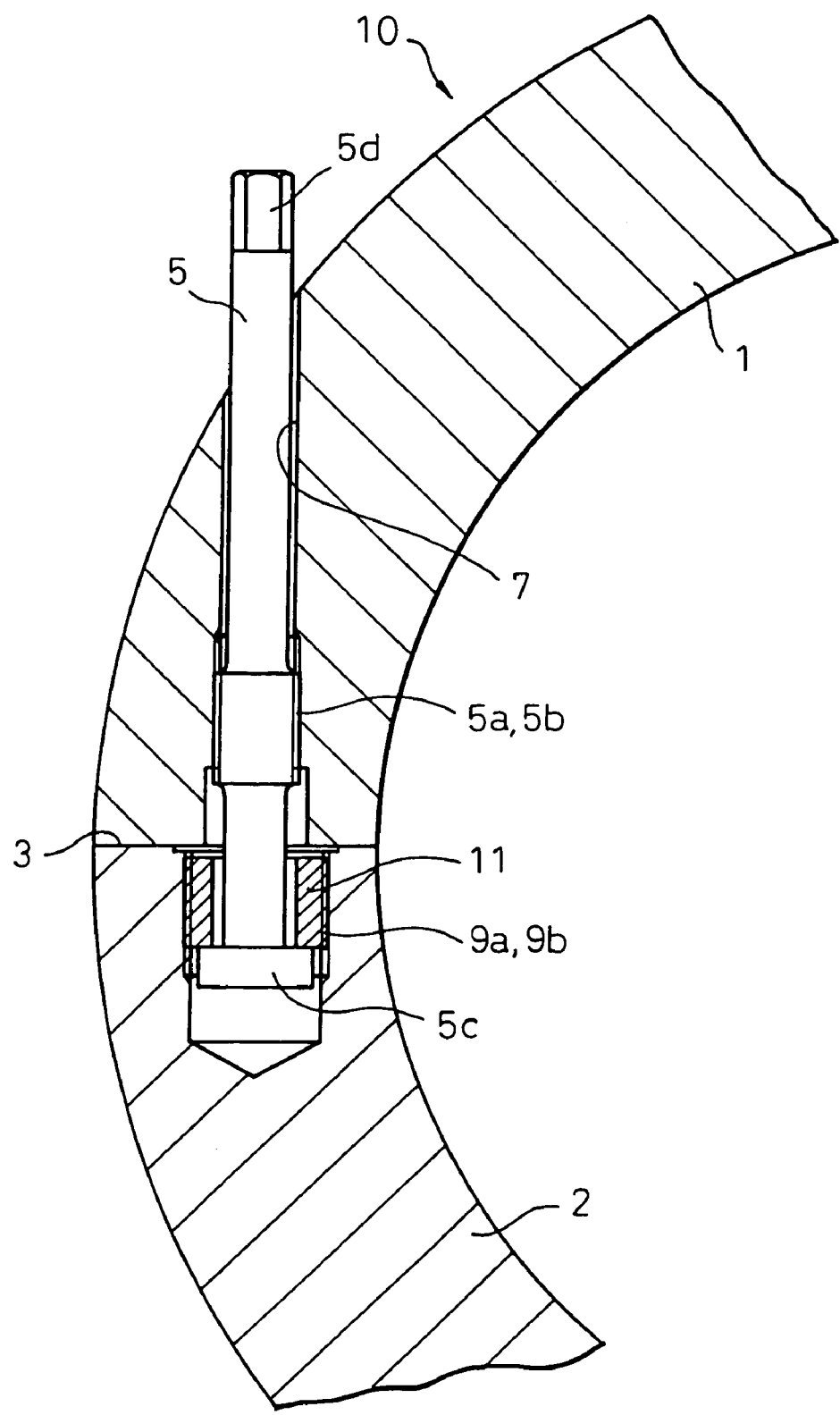
FIG. 6 is a sectional view similar to FIG. 1 illustrating a fourth embodiment of the present invention.
Figure 7:
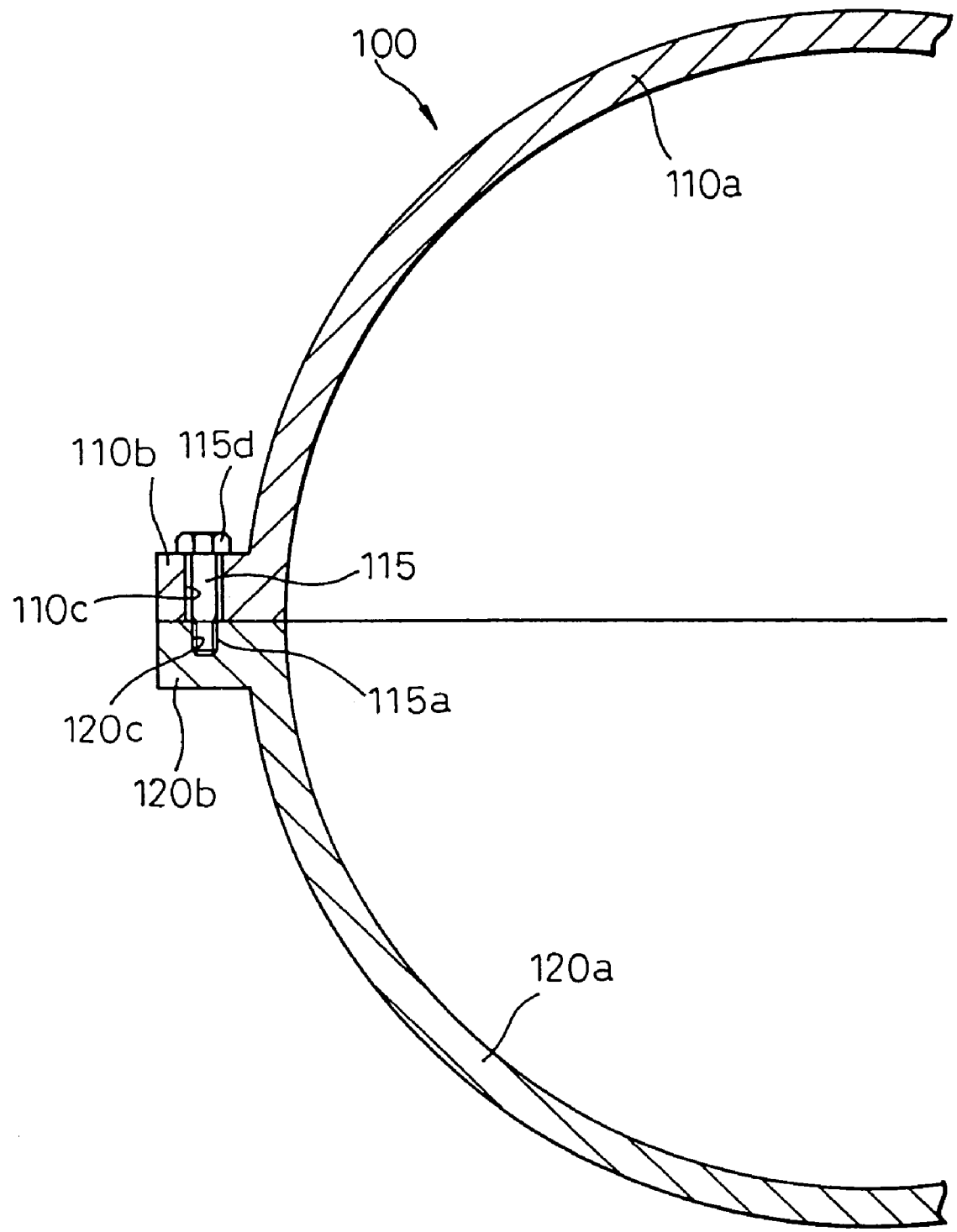
FIG. 7 is a sectional view illustrating a typical fastening arrangement for a horizontally spilt type flanged casing.

FIG. 6 is a sectional view similar to FIG. 1 illustrating a fourth embodiment of the present invention. In FIG. 6, reference numerals the same as those in FIGS. 1 and 2 designate similar elements.

Opposite to the previous embodiments, the screw threads 5b which engages the thread 5a of the fastening bolt 5 is formed on the inner surface of the bolt hole 7 in the upper casing 1 and the threaded hole 9b which engages with the sleeve 11 is formed in the lower casing 2 in this embodiment. Further, the enlarged diameter portion 5c is disposed on the lower end of the fastening bolt 5 and the thread 5a which engages the thread 5b of the bolt hole 7 is disposed at the middle of the shaft portion of the bolt 5.

When tightening the casing 10, the enlarged diameter portion 5c at the lower end of the fastening bolt 5 is first inserted into the threaded hole 9b in the lower casing 2 from the joint face 3 side, then the sleeve 11 is screwed into the threaded hole 9b. Thus, the enlarged diameter portion 5c of the bolt 5 is held in the threaded hole 9b by the sleeve 11. The upper casing 1 is, then placed on the lower casing 2 in such a manner that the upper end 5d of the fastening bolt 5 passes through the bolt hole 7 and protrudes therefrom. When the thread 5a of the bolt 5 is screwed into the thread 5b of the bolt hole 7, the enlarged diameter portion is pressed against the lower end face of the sleeve 11, thereby the upper casing 1 and the lower casing 2 are fastened together.

Similarly to the third embodiment, the flexural rigidity of the casing wall is increased according to the present embodiment since the diameter of the portion of the bolt hole 7 where the distance from the neutral axis of the deflection is large can be reduced.

As explained above, according to the present invention, the diameter of the bolt holes passing through the casing can be minimized. Therefore, the effective wall thickness of the casing can be kept large at the portion where the bolt holes are formed to maintain a large flexural rigidity of the casing. Further, by reducing the diameter of the bolt holes for fastening bolts, the fastening bolts can be disposed at smaller intervals, whereby a large and uniform tightening force can be obtained around the casing to minimize the deflection of the casing due to internal pressure and temperature.

Though the present invention has been described with reference to specific embodiments selected for the purpose of illustration, it should be understood that numerous modifications could be applied by those skilled in the art without departing from the basic concept and scope of the present invention.

For example, instead of the bolt head 5d in FIG. 4, a nut can be used for fastening the casing. In this case, the fastening bolt 5 is not provided with a bolt head and a screw thread is formed at the upper end of the shaft of the fastening bolt 5. A nut is engaged on the threaded upper end of the fastening bolt 5 after the bolt 5 is screwed into the threaded hole 5b in the lower casing 2. By tightening the nut, the lower face of the nut is pressed against the flange 11f of the sleeve, whereby shaft tensile force is exerted on the fastening bolt.

Further, though the embodiments explained above show the case where the present invention is applied to flangeless casings, the present invention can be also applied to flanged casings in order to obtain a large and uniform fastening force of the casing by reducing the interval of the fastening bolts.

The invention claimed is:

1. A fastening arrangement for a split casing assembled by fastening a plurality of casing segments, comprising:
   a first and a second casing segment assembled together by joining joint faces of the respective segments, said first and second casing segments are provided with bolt holes in such a manner that the bolt hole of the first casing segment and the bolt hole of the second casing segment align with each other and, when the first and the second casing segments are assembled together, form a continuous bolt hole crossing the joint faces and extending tangentially in walls of both casing segments, the walls of the casing segments separating an interior of a hollow casing from an exterior of the hollow casing, and at least the bolt hole in the first casing segment is provided with an internal screw thread;
   a sleeve having an external screw thread and being fitted into the bolt hole of the first casing segment by engaging the external screw thread of the sleeve with the internal screw thread of the bolt hole of the first casing segment; and
   a fastening bolt provided with an enlarged diameter portion provided on a shaft portion of the fastening bolt, and passing through the bolt hole of the first casing segment and the sleeve therein, wherein said enlarged diameter portion abuts an end of the sleeve opposite to the joint face and, when a tensile force is exerted on the fastening bolt at the portion between the enlarged diameter portion and the second casing segment, the tensile force is first transferred from the fastening bolt to the sleeve through the abutment of the enlarged diameter portion and the end face of the sleeve, then transferred from the sleeve to the first casing segment through the engagement of the external screw thread of the sleeve and internal screw thread of the bolt hole and generates a fastening force for pressing the first casing segment against the second casing segment,
   wherein said enlarged diameter portion is integrally formed on the shaft portion of the fastening bolt such that said enlarged portion of the fastening bolt is housed in said bolt hole when said enlarged diameter portion abuts the end of the sleeve opposite to the joint face,
   wherein the bolt hole is formed perpendicular to the joint face from the first casing segment, and wherein the fastening bolt has a length such that an upper end of the bolt protrudes from the first casing segment when the fastening bolt is screwed into the bolt hole in the second casing segment.

2. The fastening arrangement according to claim 1 wherein a diameter of said bolt hole of the first casing segment is enlarged at a portion of said bolt hole of the first casing segment having said internal screw threads as compared with a diameter of said bolt hole of the first casing segment at an outer surface of the first casing segment which does not include the joint face of said first casing segment.

3. A fastening arrangement for a horizontally split type hollow casing for a hydraulic machine in which the casing of the hydraulic machine is assembled by fastening two casing halves, comprising:
   a first and a second casing half assembled together by joining joint faces of the respective casing halves, said first and second casing halves are provided with bolt holes in such a manner that the bolt hole of the first casing half and the bolt hole of the second casing half align with each other and, when the first and the second casing halves are assembled together, form a continuous bolt hole crossing the joint faces and extending tangentially in walls of both casing halves, the walls of the casing halves separating an interior of the split type hollow casing from an exterior of the split type hollow casing, said bolt holes in the first and the second casing halves are provided with internal screw threads;
   a sleeve having an external screw thread and being fitted into the bolt hole of the first casing half by engaging the external screw thread of the sleeve with the internal screw thread of the bolt hole of the first casing half; and
   a fastening bolt provided with an external screw thread at one end for engaging the internal screw thread of the bolt hole in the second casing half and an enlarged diameter portion provided on a shaft portion of the fastening bolt at a portion apart from said external screw thread, said fastening bolt passing through the bolt hole of the first casing half and the sleeve therein, wherein said enlarged diameter portion abuts an end of the sleeve opposite to the joint face when the fastening bolt is screwed into the bolt hole in the second casing half, whereby a tensile force generated in the fastening bolt by screwing the fastening bolt into the bolt hole in the second casing half is first transferred from the fastening bolt to the sleeve through the abutment of the enlarged diameter portion and the end face of the sleeve, then transferred from the sleeve to the first casing segment through the engagement of the external screw thread of the sleeve and internal screw thread of the bolt hole in the first casing half and generates a fastening force for pressing the first casing half against the second casing half,
   wherein said enlarged diameter portion is integrally formed on the shaft portion of the fastening bolt such that said enlarged portion of the fastening bolt is housed in said bolt hole when said enlarged diameter portion abuts the end of the sleeve opposite to the joint face,
   wherein the bolt hole is formed perpendicular to the joint face from the first casing half, and wherein the fastening bolt has a length such that an upper end of the bolt protrudes from the first casing half when the fastening bolt is screwed into the bolt hole in the second casing half.

4. The fastening arrangement according to claim 3 wherein a diameter of said bolt hole of the first casing half is enlarged at a portion of said bolt hole of the first casing half having said internal screw threads as compared with a diameter of said bolt hole of the first casing half at an outer surface of the first casing half which does not include the joint face of said first casing half.

* * * * *